United States Patent
Shafin et al.

(10) Patent No.: US 12,082,147 B2
(45) Date of Patent: Sep. 3, 2024

(54) LINE OF SIGHT (LoS)/NON-LINE OF SIGHT (NLoS) POINT IDENTIFICATION IN WIRELESS COMMUNICATION NETWORKS USING ARTIFICIAL INTELLIGENCE

(71) Applicant: Samsung Electronics Co., Ltd., Suwon-si (KR)

(72) Inventors: Rubayet Shafin, Allen, TX (US); Vishnu Vardhan Ratnam, Plano, TX (US); Hao Chen, Allen, TX (US); Yan Xin, Princeton, NJ (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 17/460,022

(22) Filed: Aug. 27, 2021

(65) Prior Publication Data
US 2022/0095267 A1   Mar. 24, 2022

Related U.S. Application Data

(60) Provisional application No. 63/080,400, filed on Sep. 18, 2020.

(51) Int. Cl.
*H04W 64/00* (2009.01)
*G01S 5/02* (2010.01)
(Continued)

(52) U.S. Cl.
CPC ......... *H04W 64/006* (2013.01); *G01S 5/0218* (2020.05); *G06N 20/00* (2019.01); *H04W 24/10* (2013.01)

(58) Field of Classification Search
CPC .... H04W 64/006; H04W 24/10; G06N 20/00; G01S 5/0218
(Continued)

(56) References Cited

U.S. PATENT DOCUMENTS 10,516,999 B1 * 12/2019 Desai ............... H04W 16/28
2013/0051434 A1 * 2/2013 Draganov ........... G01S 5/0273
375/E1.032
(Continued)

FOREIGN PATENT DOCUMENTS

| CN | 103399297 B | 8/2015 |
|---|---|---|
| CN | 11565062 A | 8/2020 |

(Continued)

OTHER PUBLICATIONS

Xiao, Zhuoling, et al., "Non-Line-of-Sight Identification and Mitigation Using Received Signal Strength", IEEE Transactions on Wireless Communications, Mar. 2015, 14 pgs., vol. 14, No. 3, IEEE.
(Continued)

*Primary Examiner* — Joel Ajayi

(57) ABSTRACT

A method for performing line-of-sight (LoS)/non-line-of-sight (NLoS) filtering includes collecting, from at least one user equipment (UE) operating within a coverage area of a base station, a plurality of measurement reports from the at least one UE, wherein each measurement report of the plurality of measurement reports comprises a measured value of a signal parameter and location information of the at least one UE. The method further includes training a LoS/NLoS classification model on the plurality of measurement reports, obtaining a new measurement report from a UE operating at a first location within the coverage area of the base station and passing the new measurement report from the UE to the trained LoS/NLoS classification model to obtain a LoS/NLoS classification of the first location.

18 Claims, 10 Drawing Sheets

(51) Int. Cl.
*G06N 20/00* (2019.01)
*H04W 24/10* (2009.01)

(58) Field of Classification Search
USPC ....................................................... 455/456.1
See application file for complete search history.

(56) References Cited

U.S. PATENT DOCUMENTS

2020/0186266 A1   6/2020  Wan et al.
2022/0229143 A1*  7/2022  Dwivedi ............... G01S 5/0273

FOREIGN PATENT DOCUMENTS

CN    112800983 A   5/2021
EP      3823372 A1  5/2021

OTHER PUBLICATIONS

Fan, Jiancun, et al., "Non-Line-of-Sight Identification Based on Unsupervised Machine Learning in Ultra Wideband Systems", IEEE Access, Mar. 26, 2019, 8 pgs., vol. 7, IEEE.

Choi, Jeong-Sik, et al., "Deep Learning Based NLOS Identification with Commodity WLAN Devices", IEEE Transactions on Vehicular Technology, Dec. 8, 2017, 9 pgs., vol. 67, No. 4, IEEE.

Zheng, Qingbi, et al., "Channel Non-Line-of-Sight Identification Based on Convolutional Neural Networks", IEEE Wireless Communications Letters, Sep. 2020, 5 pgs., vol. 9, No. 9, IEEE.

* cited by examiner

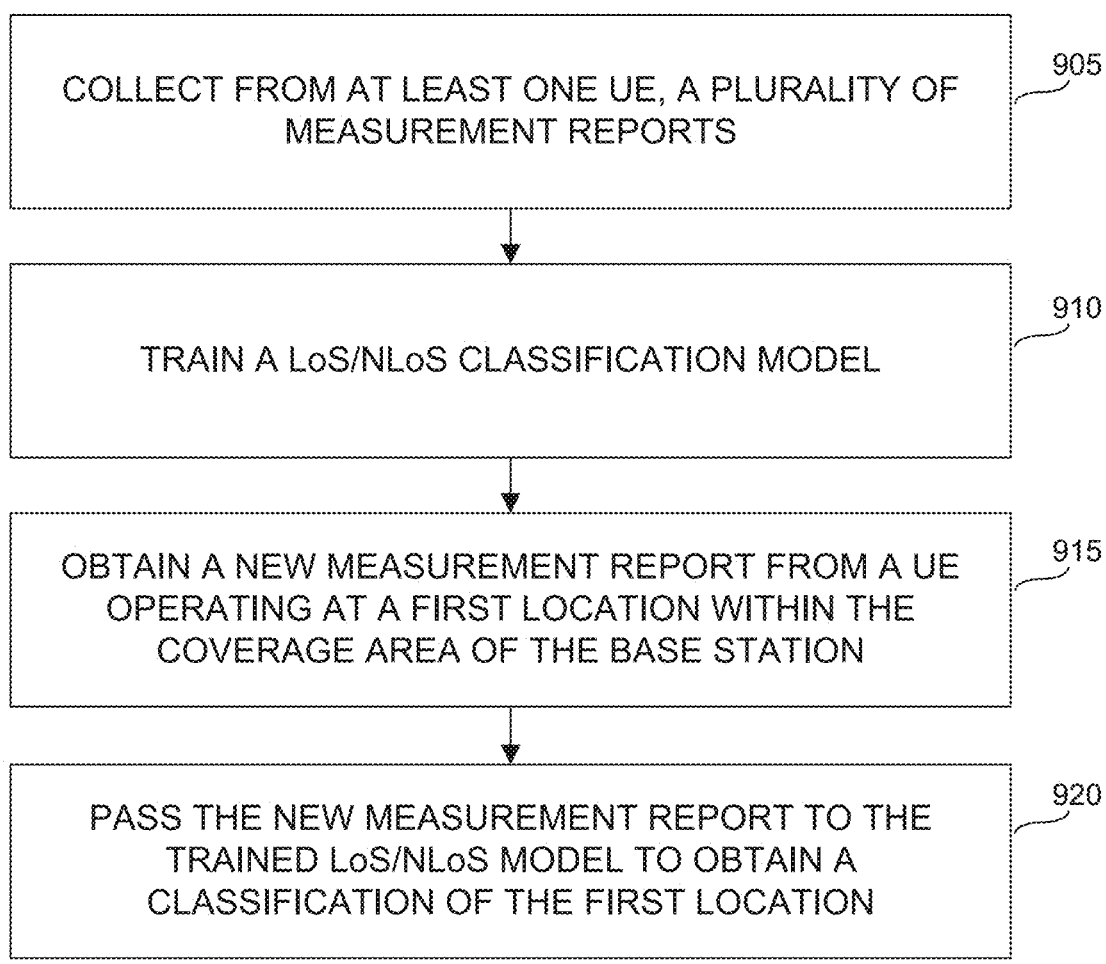

LINE OF SIGHT (LoS)/NON-LINE OF SIGHT (NLoS) POINT IDENTIFICATION IN WIRELESS COMMUNICATION NETWORKS USING ARTIFICIAL INTELLIGENCE

CROSS-REFERENCE TO RELATED APPLICATION AND CLAIM OF PRIORITY

This application claims priority under 35 U.S.C. § 119(e) to U.S. Provisional Patent Application No. 63/080,400 filed on Sep. 18, 2020. The above-identified provisional patent application is hereby incorporated by reference in its entirety.

TECHNICAL FIELD

This disclosure relates generally to wireless communication networks. More specifically, this disclosure relates to methods and apparatus for line of sight (LoS)/non-line of sight (NLoS) point identification in wireless communication networks using artificial intelligence.

BACKGROUND

Advances in wireless communication technologies, including the advent of 5G wireless technologies have greatly expanded the potential throughput and functionality of wireless communication systems. For many applications, precise knowledge of a terminal or user equipment's (UE) location relative to a base station or other network entity is a first precondition for realizing location-dependent services made possible by advances in wireless communication technologies. A further precondition for providing many location-dependent services is knowing whether a radio signal path between a UE and another network entity with which the UE is communicating is an unobstructed straight-line path, otherwise known as line-of-sight ("LoS"), or whether the radio signal path is not a straight, unobstructed line, otherwise known as non-line-of-sight. ("NLoS"). Generally speaking, LoS points are of more operational use for tuning the performance of a wireless network (for example, transmission parameters of a base station, such as electronic and mechanical tilt), than NLoS points, as measured values of signal parameters at LoS points more directly correlate with the operational parameters of the base station. By contrast, in NLoS points within the coverage area of a base station (for example, inside a building), the strength and quality of a received signal may be significantly more dependent on local factors (for example, the thickness and placement of walls) than the configuration of the base station.

Presently, assessment of whether a particular point is LoS or non-LOS relative to a base station or other network entity of interest is determined based on signal parameters such as time of arrival (ToA) or delay spread (DS) of signals between devices and the base station, or alternatively, based on three-dimensional maps of the area of interest. Both of these approaches are less than optimal for at least the following reasons. Analyses of signal parameters are premised on signal data which, depending on the devices used to access the network and their configuration, is not always available. Further, analyses of signal parameters do not accurately characterize points as LoS/NLoS with sufficient reliability. Three dimensional maps can be expensive and difficult to produce, meaning that 3-D map data may be unavailable for many areas of interest.

Accurate classification of locations within a coverage area of a base station is, in many cases, a precondition for reliably providing location-based services, as well as a precondition for effective network configuration and optimization. Accordingly, obtaining accurate LoS/NLoS data throughout a coverage area of a base station or other network entity remains a source of technical challenges and opportunities for improvement in the art.

SUMMARY

This disclosure provides methods and apparatus for methods and apparatus for line of sight (LoS)/non-line of sight (NLoS) point identification in wireless communication networks using artificial intelligence.

In one embodiment, a method for performing line-of-sight (LoS)/non-line-of-sight (NLoS) filtering includes collecting, from at least one user equipment (UE) operating within a coverage area of a base station, a plurality of measurement reports from the at least one UE, wherein each measurement report of the plurality of measurement reports comprises a measured value of a signal parameter and location information of the at least one UE. The method further includes training a LoS/NLoS classification model on the plurality of measurement reports, obtaining a new measurement report from a UE operating at a first location within the coverage area of the base station and passing the new measurement report from the UE to the trained LoS/NLoS classification model to obtain a LoS/NLoS classification of the first location.

In another embodiment, a user equipment (UE) includes a transceiver, a processor, and a memory. The memory contains instructions, which, when executed by the processor, cause the UE to, at a first location within a coverage area of a base station, receive a signal from the base station via the transceiver, obtain location information of the UE, measure the received signal to obtain a measured value of a signal parameter and send to the base station, via the transceiver, a measurement report, the measurement report comprising the location information of the UE and the measured value of the signal parameter.

In another embodiment, a network entity includes a processor, a network interface and a memory. The memory contains instructions, which when executed by the processor, cause the network entity to collect, via the network interface, a plurality of measurement reports from at least one UE operating within a coverage area of a base station, wherein each measurement report of the plurality of measurement reports comprises a measured value of a signal parameter and location information of the at least one UE. When executed by the processor, the instructions further cause the network entity to train a LoS/NLoS classification model on the plurality of measurement reports, obtain, via the network interface, a new measurement report from a UE operating at a first location within the coverage area of the base station, and pass the new measurement report from the UE to the trained LoS/NLoS classification model to obtain a LoS/NLoS classification of the first location.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates operations of an example method for performing LoS/NLoS filtering according to various embodiments of this disclosure.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
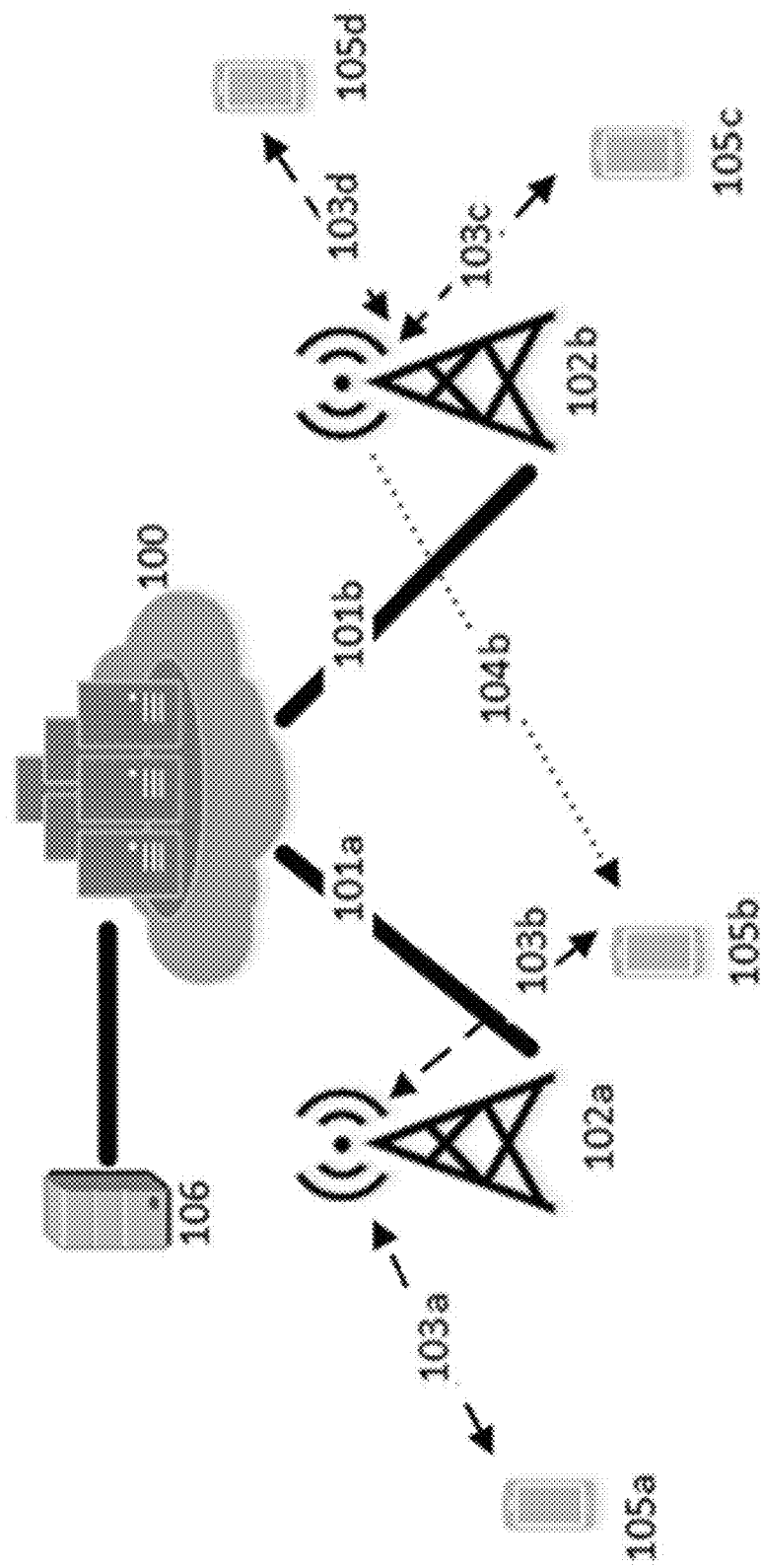
FIG. 1 provides an illustrative example of a wireless network in which LoS/NLoS filtering according to certain embodiments of this disclosure may be performed.

FIG. 1 provides an illustrative example of a wireless network in which LoS/NLoS filtering according to certain embodiments of this disclosure may be performed. Referring to the explanatory example of FIG. 1, a BS (102a) may be connected to the core network (100) by a fiber/wired backhaul link (101a). Each BS (102a) may further serve multiple user terminals 105a, 105b, and 105c via wireless interfaces 103a, 103b and 103c respectively. Using this interface 103b, a user terminal 105b may receive and transmit signals to its serving BS 102b. Using signals received 104b from a non-serving BS 102b, a user terminal 105b may also receive signals from a neighboring BS 102b. The core network may further have a network entity 106 responsible for the task of LoS/NLoS point identification, as shall be described below.

Figure 2:
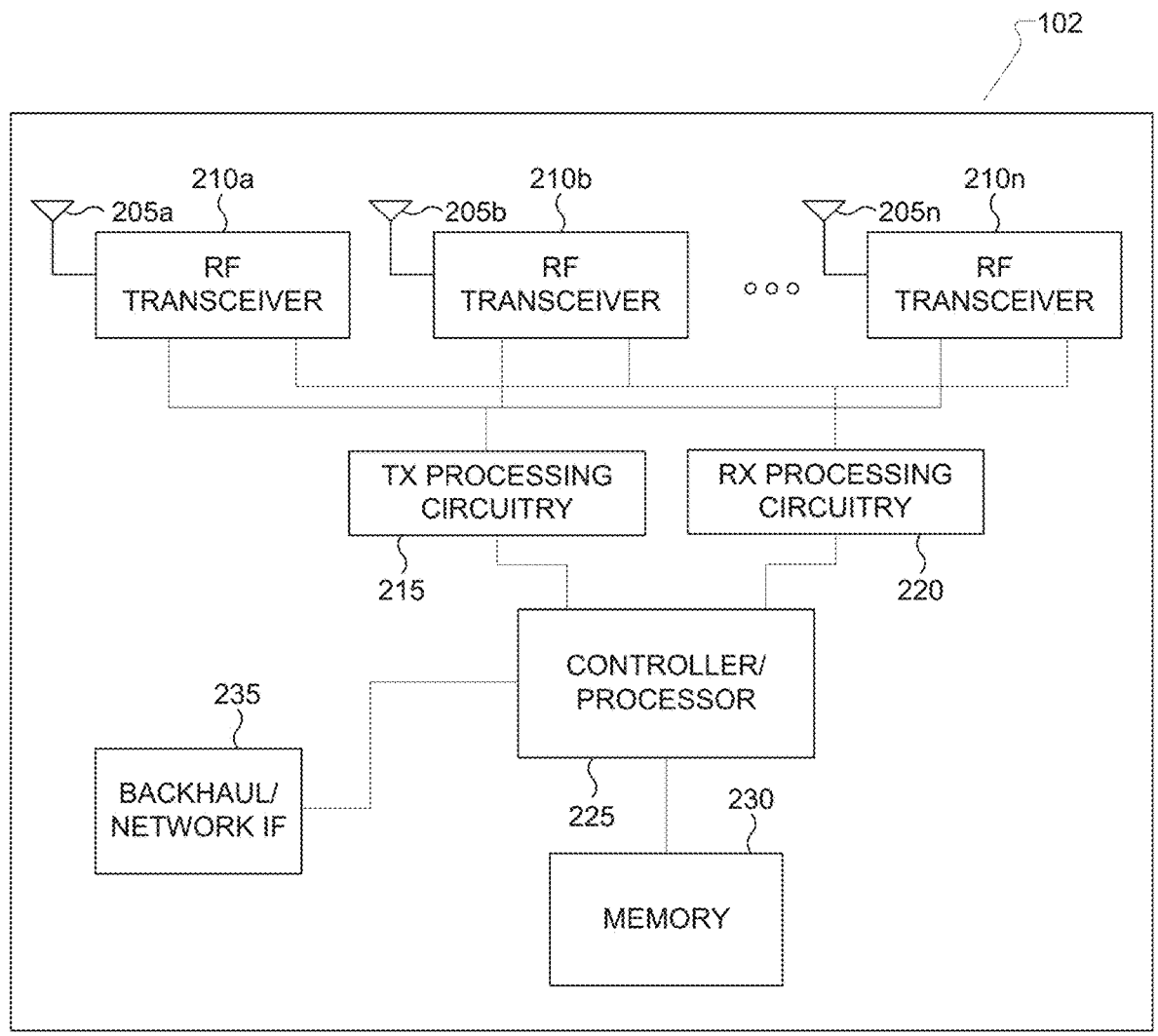
FIG. 2 illustrates an example of an evolved Node B ("eNB") in accordance with an embodiment of this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in the explanatory example of FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n. According to certain embodiments, the RF signals transmitted via antennas 205a-205n are encoded such that data to be transmitted, and the associated signaling are apportioned to time/frequency resource blocks ("RBs"). In this illustrative example, eNB 102 provides, through antennas 205a-205n wireless signals over a coverage area, and has a number of operational parameters, such as antenna height, electronic and mechanical tilt, by which the coverage area can be tuned. In this way, the base station can, for example, transmit signals satisfying threshold values for received signal strength and received signal quality within a designated coverage area of the base station.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
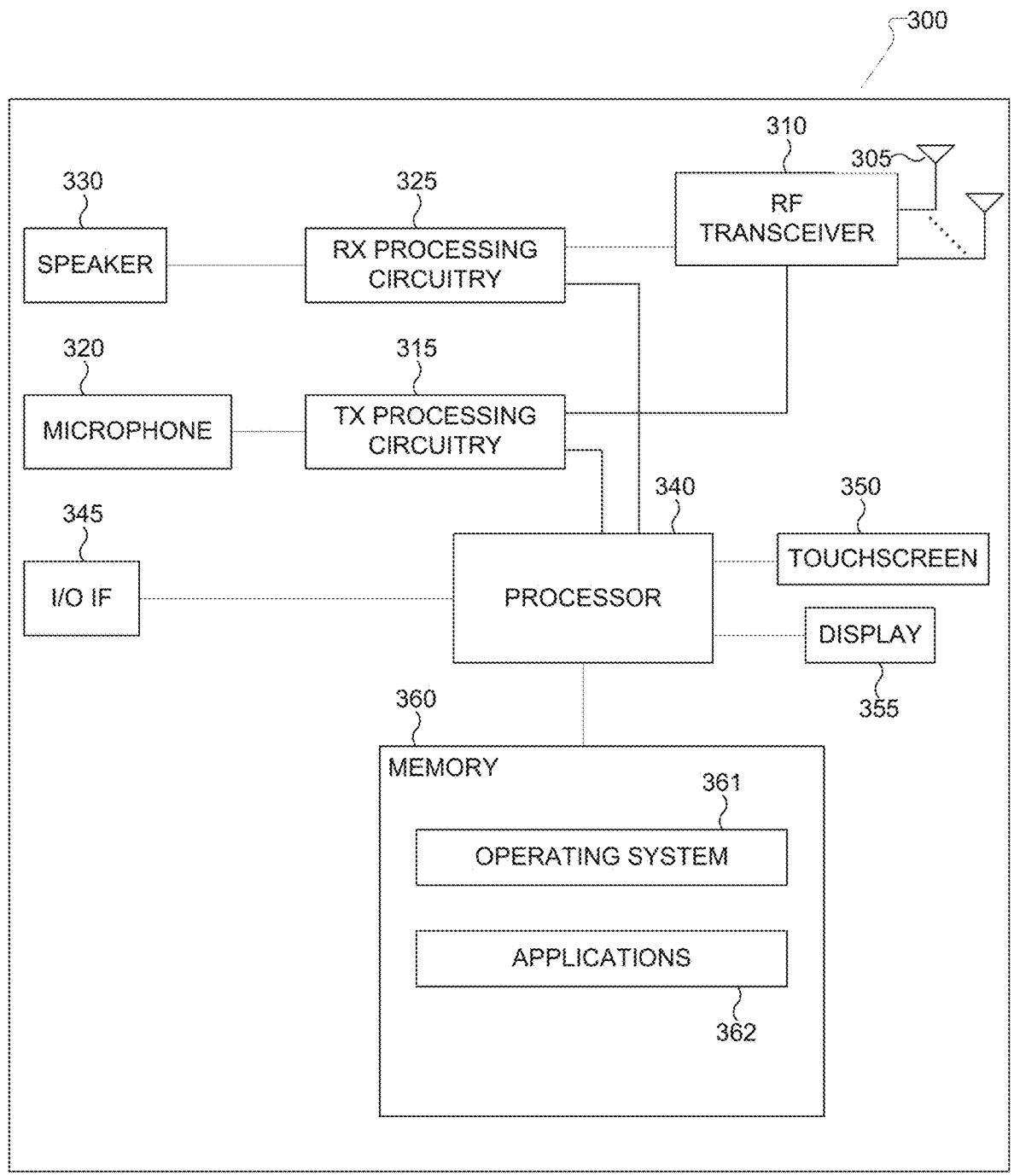
FIG. 3 illustrates an example of a user equipment ("UE") in accordance with an embodiment of this disclosure.

FIG. 3 illustrates an example UE 300 according to this disclosure. The embodiment of the UE 300 illustrated in FIG. 3 is for illustration only, and the UEs 105a-105c of FIG. 1 could have the same or similar configuration. However, UEs come in a wide variety of configurations, and FIG. 3 does not limit the scope of this disclosure to any particular implementation of a UE.

As shown in FIG. 3, the UE 300 includes an antenna 305, a radio frequency (RF) transceiver 310, transmit (TX) processing circuitry 315, a microphone 320, and receive (RX) processing circuitry 325. The UE 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. According to certain embodiments, TX processing circuitry and RX processing circuitry encode and decode data and signaling for wireless in resource blocks ("RBs" or physical resource blocks "PRBs") which are transmitted and received by, inter alia, the eNBs of a wireless network (for example, wireless network 100 in FIG. 1). Put differently, TX processing circuitry 215 and RX processing circuitry 220 generate and receive RBs which contribute to a measured load at an eNB. Additionally, RX processing circuitry 220 may be configured to measure values of one or more parameters of signals received at UE 300.

The main processor 340 can include one or more processors or other processing devices and execute the basic OS program 361 stored in the memory 360 in order to control the overall operation of the UE 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 300 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 300 can use the keypad 350 to enter data into the UE 300. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

Although FIG. 3 illustrates one example of UE 300, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 300 configured as a mobile telephone or smartphone, UEs could be configured to operate as other types of mobile or stationary devices.

Figure 4:
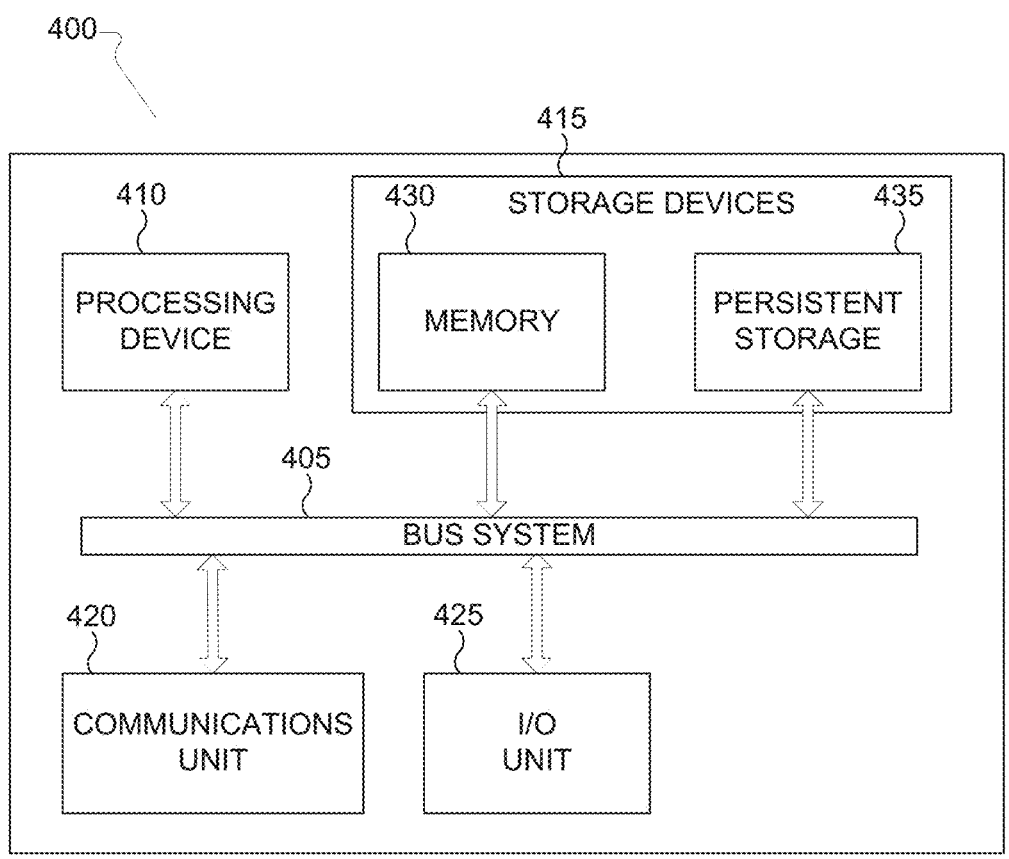
FIG. 4 illustrates an example of a server in accordance with an embodiment of this disclosure.

FIG. 4 illustrates an example of a server 400 according to certain embodiments of this disclosure. According to certain embodiments, server 400 may be part of a core network (for example, core network 100 in FIG. 1)

As shown in FIG. 4, the server 400 includes a bus system 405, which supports communication between at least one processing device 410, at least one storage device 415, at least one communications unit 420, and at least one input/output (I/O) unit 425.

The processing device 410 executes instructions that may be loaded into a memory 430. The processing device 410 may include any suitable number(s) and type(s) of processors or other devices in any suitable arrangement. Example types of processing devices 410 include microprocessors, microcontrollers, digital signal processors, field programmable gate arrays, application specific integrated circuits, and discrete circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random-access memory or any other suitable volatile or non-volatile storage device(s). The persistent storage 435 may contain one or more components or devices supporting longer-term storage of data, such as a ready only memory, hard drive, Flash memory, or optical disc.

The communications unit 420 supports communications with other systems or devices. For example, the communications unit 420 could include a network interface card or a wireless transceiver facilitating communications over the network 402. The communications unit 420 may support communications through any suitable physical or wireless communication link(s). According to certain embodiments, communications unit 420 comprises a network interface or other communications interface through which server 400 can receive status data from hardware (for example, eNBs, digital units ("DUs"), and remote radio heads ("RRHs")) of a wireless communication network, and also transmit commands for adjusting one or more operational parameters (for example, power level, electronic tilt ("E-tilt")) of such hardware.

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Figure 5:
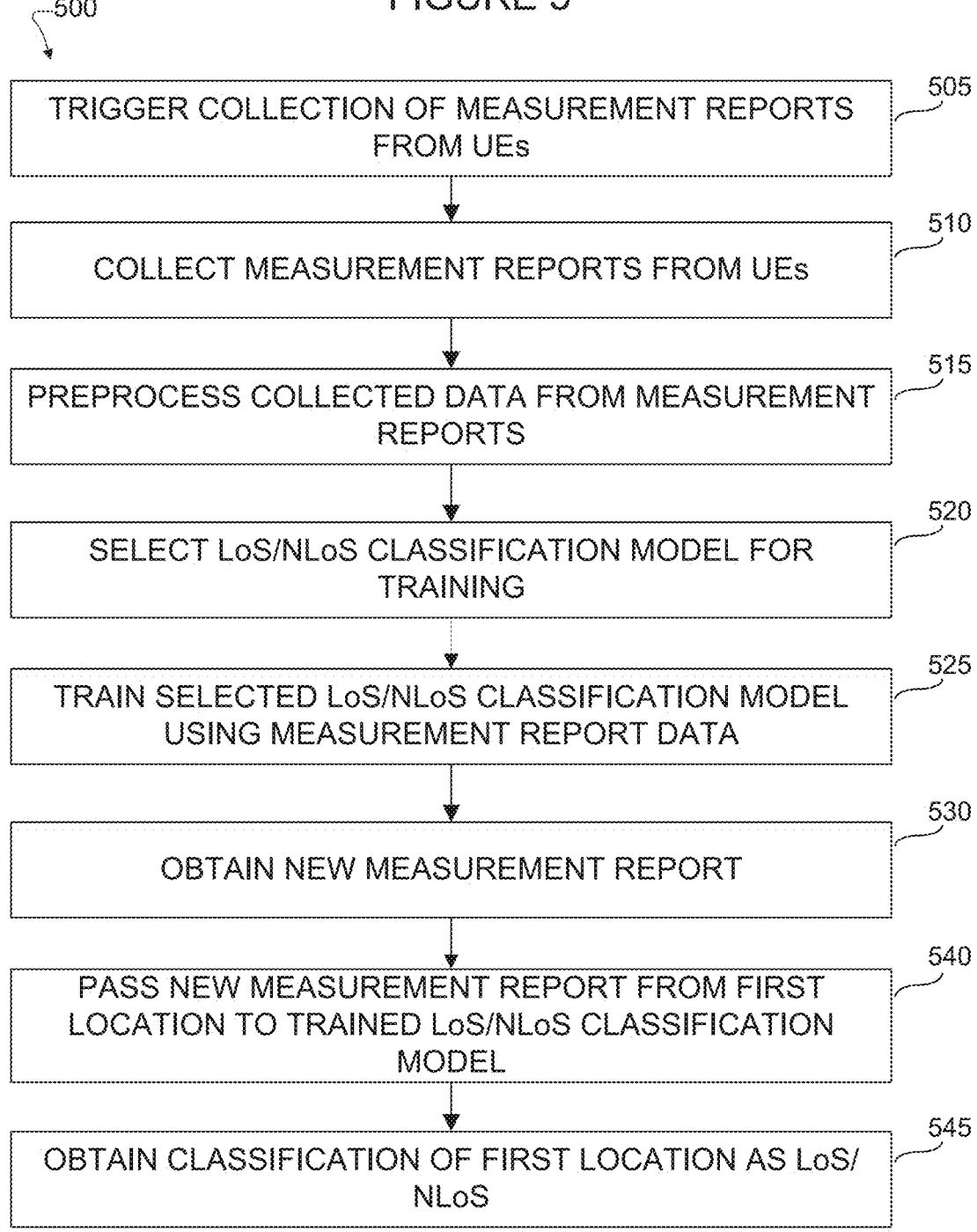
FIG. 5 illustrates operations of an example method for performing LoS/NLoS filtering according to various embodiments of this disclosure.

FIG. 5 illustrates operations of an example method 500 for performing LoS/NLoS filtering according to various embodiments of this disclosure. In this explanatory example, method 500 is described from the perspective of a network entity (for example, core network 100 in FIG. 1 or server 400 in FIG. 4) which is communicatively connected (for example, via backhaul links) to one or more base stations (for example, base station 102a in FIG. 1, or base station 102 in FIG. 2). In the illustrative example of FIG. 5, the base station is in turn, communicatively connected with (i.e., can transmit message to, and receive messages from) one or more UEs within a coverage area of the base station.

As shown in FIG. 5, at operation 505, collection of measurement reports is triggered at the core network. In some embodiments, operation 505 is performed in response to satisfaction of a temporal condition, such as the expiration of a timer or a particular clock value. In some embodiments, operation 505 is performed in response to a predetermined condition associated with a need for, or opportunity to collect additional LoS/NLoS classification data in a coverage in a service area. Examples of such predetermined conditions include, without limitation, conditions indicating a poor mapping of base station coverage to usage demand, such as a high incidence of dropped calls or utilization of a particular base station dropping below a threshold value relative to neighbor base stations. Further examples of predetermined conditions which may trigger collection include evidence of a threshold number of UEs from which data can be collected in the service zone of the base station.

In some embodiments, at operation 510, measurement reports are collected from UEs in a coverage area of the base station and aggregated for analysis at one or more nodes (for example, server 400 in FIG. 4) of the network. According to some embodiments, each measurement report comprises a measured value of a signal parameter (for example, RSRP, RSRQ from one or more base stations, including the serving base station of the UE), and a location information of the UE, such as a GPS coordinate value. A measurement report may comprise a plurality of location specific signal parameter measurements, obtained at different times between collection intervals. Also, in some embodiments, the measurement report may comprise measurements of signals from a plurality of base stations. For example, where a UE is at a location where it can receive reference signals from two or more base stations, measurement reports for each base station may be prepared at the UE. Additionally, in some embodiments, the measurement reports collected at operation 510 comprise at least one configuration parameter of the reporting UE. Examples of configuration parameters include, without limitation, a location accuracy indication, an orientation of the UE, a Cell ID or a value of a flag indicating connectivity of the UE to a Wi-Fi service. Depending on the classification model, configuration parameters of the UE can be predictive of whether a location is in LoS or NLoS. For example, connectivity to a Wi-Fi network is a general indicator that a UE is in an indoor location, and thus likely not LoS to a base station.

At operation 515, the collected data from the measurement reports is preprocessed. In some embodiments, preprocessing at operation 515 comprises identifying and expunging measurement reports with unusable data, such as measurements reports which do not include location data, or measurement reports with other indicia of unusability, such as out-of-range time stamp data.

Referring to the non-limiting example of FIG. 5, in some embodiments, at operation 520, the network entity selects a classification model for training with the data from the collected measurement reports. In some embodiments, the network entity trains a single model for performing LoS/NLoS classification. In other embodiments, a network entity may, depending on the availability of data, and computational resources, train a plurality of models for performing LoS/NLoS classification. Depending on the overall coverage of the wireless network, implementing multiple LoS/NLoS classification models may provide performance gains, with certain models performing better on different types of topographies (for example, mountains versus cities)

At operation 525, the LoS/NLoS classification model selected at operation 520 is trained on a data set comprising data from measurement reports obtained at operation 510. In some embodiments, for example, embodiments where the LoS/NLoS classification model using a neural network, applying a gradient descent algorithm to optimize weightings of connections between the constituent neurons of the neural network. In embodiments, where the LoS/NLoS classification model is a random forest classifier, training at operation 525 comprises generating random decision trees based on the input parameters and polling across trees to identify predictive features.

Referring to the illustrative example of FIG. 5, at operation 530, at least one new measurement report associated with a first location, the measurement report comprising a measured value of a signal parameter (for example, RSRP or RSRQ from the base station) and location information of the UE (for example, GPS coordinates of the UE at the time the signal was received) is obtained. The new measurement report may, at operation 540, be passed to the LoS/NLoS classification model trained at operation 525, and at operation 545, a classification of the first location as LoS or NLoS is obtained.

The above flowchart illustrates example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Figure 6:
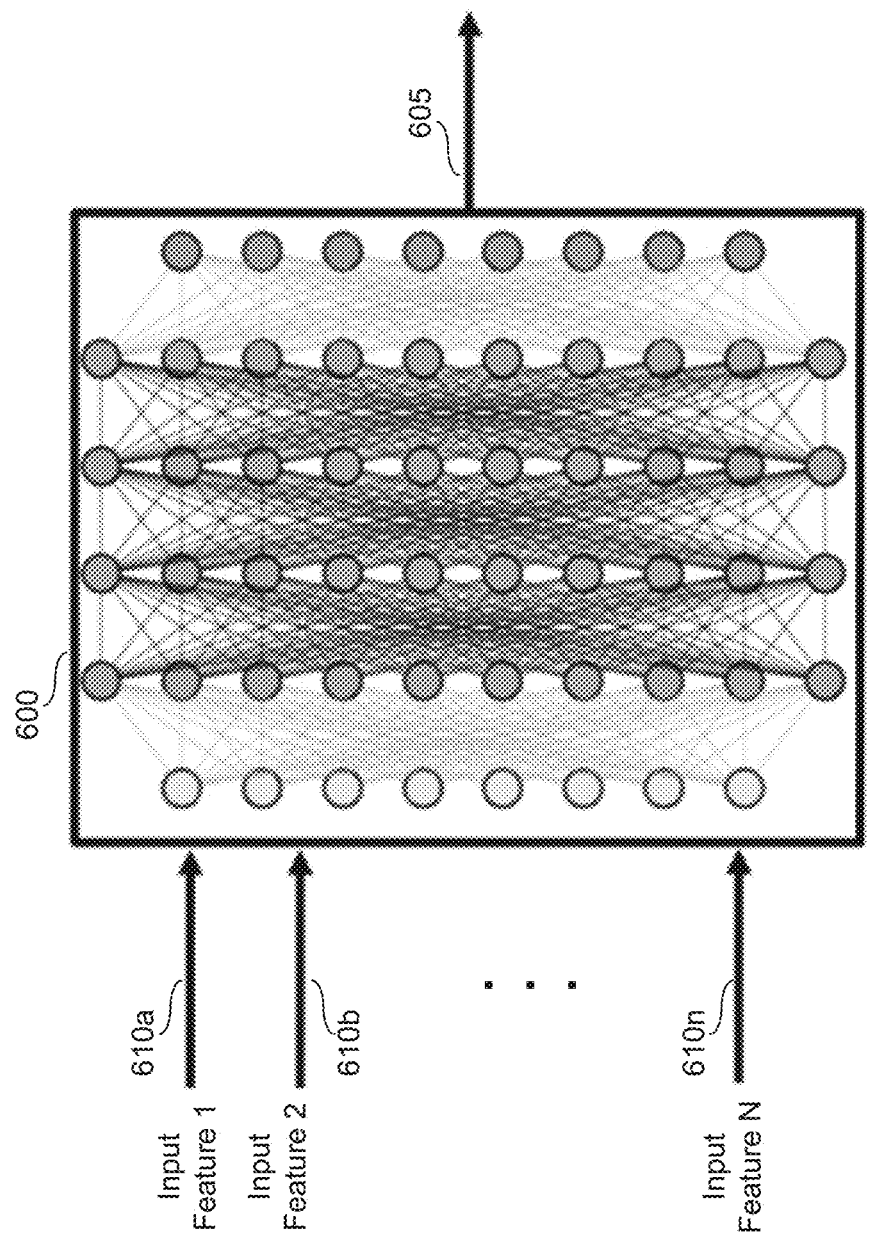
FIG. 6 illustrates an example of a neural network as an LoS/NLoS classifier, according to various embodiments of this disclosure.

FIG. 6 illustrates an example of a neural network as an LoS/NLoS classifier, according to various embodiments of this disclosure.

Referring to the explanatory example of FIG. 6, artificial intelligence (AI) based classification of points within a base station's service area can be performed by training a multi-layer perceptron (MLP) 600 as a classifier. According to certain embodiments MLP 600 is a feed-forward neural network with multiple layers of neurons, with weighted connections. In some embodiments, MLP 600 is a convolutional neural network (CNN) with back propagation between layers. In some embodiments, MLP 600 is embodied on a computing platform (for example, server 400 in FIG. 4 or core network 100 in FIG. 1) which is configured to receive from base stations, measurement reports obtained from user equipment. In some embodiments, depending on the utilization of the base station and the computational resources available at the base station, MLP 600 may be implemented at a base station or other network node able to receive, either directly or indirectly, measurement reports from UEs.

According to various embodiments, MLP 600 is trained to associate a categorization 605 of a location as LoS/NLoS based on a plurality of input features (for example, input features 610a-610n). While the number of input features can vary across embodiments and in response to the available data fields provided in measurement reports from UEs, the input features generally comprise, at a minimum, a first feature 610a corresponding to a value of a signal parameter as measured by a UE at a given location, and a second feature 610b corresponding to the location of the UE relative to the base station. In some embodiments, to help promote the volume of data for training and classifying points within a service area, the signal parameter used as first feature 610a is one which is common to multiple generations (for example, 3G, LTE, and 5G) of wireless communication protocols. In this way, the number of devices which can provide actionable data is, to the extent possible, not limited by the age of the devices. Examples of signal parameters whose values may be used as a first feature 610a include, without limitation, an RSRP value of a serving base station or an RSRQ value of a serving base station.

In certain embodiments, second feature 610b is an expression of a three-dimensional distance of the UE from a serving base station. Equation (1), reproduced below shows how a three-dimensional distance $d_u$ may be determined.

$$d_u = \sqrt{(x_u - x_{BS})^2 + (y_u - y_{BS})^2 + (z_u - z_{BS})^2} \qquad (1)$$

Where $x_u - x_{BS}$ represents the difference in coordinate values between a serving base station and the UE in the x direction, $y_u - y_{BS}$ represents the difference in coordinate values between the serving base station and the UE in the y direction, and $z_u - z_{BS}$ represents the difference in coordinate values between the serving base station and the UE in the z direction.

As shown in the explanatory example of FIG. 6, in certain embodiments, the number of input features used for training and obtaining predictive outputs from MLP 600 can be greater than two. Examples of further input features which may be provided to MLP 600 include, without limitation, height coordinates of the base station, altitude and GPS data from the UE, and configuration parameters of the UE, including, without limitation, information as to the orientation of the UE, a Cell ID of the base station, or a value of a flag indicating whether the UE is connected to a Wi-Fi or other near field communication protocol network.

According to certain embodiments, MLP 600 can be trained on measurement report data to output classifications of a location associated with a measurement report using one or more of supervised learning techniques, semi-supervised learning techniques or unsupervised learning techniques. For example, in embodiments using supervised learning techniques, MLP 600 is trained on a dataset which includes ground truth outputs of the LoS/NLoS classification of a particular location in a coverage area of a base station. In this way, the weightings between neurons of MLP 600 are adjusted (for example, using a gradient descent algorithm) until the outputs of MLP 600 for a given set of input features reliably converge on a set of expected values. In some embodiments using unsupervised learning techniques, measurement report data is passed to MLP 600, which iteratively identifies structure in the measurement report data and essentially clusters data with similar structural features. According to certain embodiments, the clustered outputs require further review and labeling by an individual. In certain embodiments using semi-supervised learning techniques, MLP 600 is trained initially on a data set with ground truth values of categorization 605, and then further trained on a data set without ground truth values of the LoS/NLoS classification of a particular location.

Once MLP 600 is trained, input features 610a-610n from a measurement data report for a given location can be passed through the neural network of MLP 600 to obtain a categorization 605 of the given location. According to some embodiments, categorization 605 may be provided as a binary vector with values for "LoS" and "NLoS" or as a vector of relative probabilities of the two categorizations of the given location.

Figure 7A:
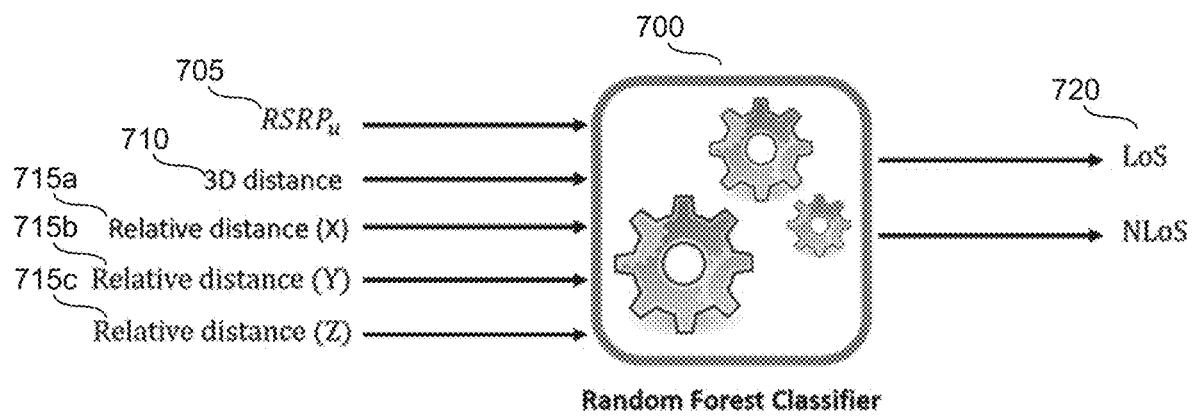
FIGS. 7A and 7B illustrates aspects of example implementations of LoS/NLoS classification using a random forest classifier model according to various embodiments of this disclosure.
Figure 7B:
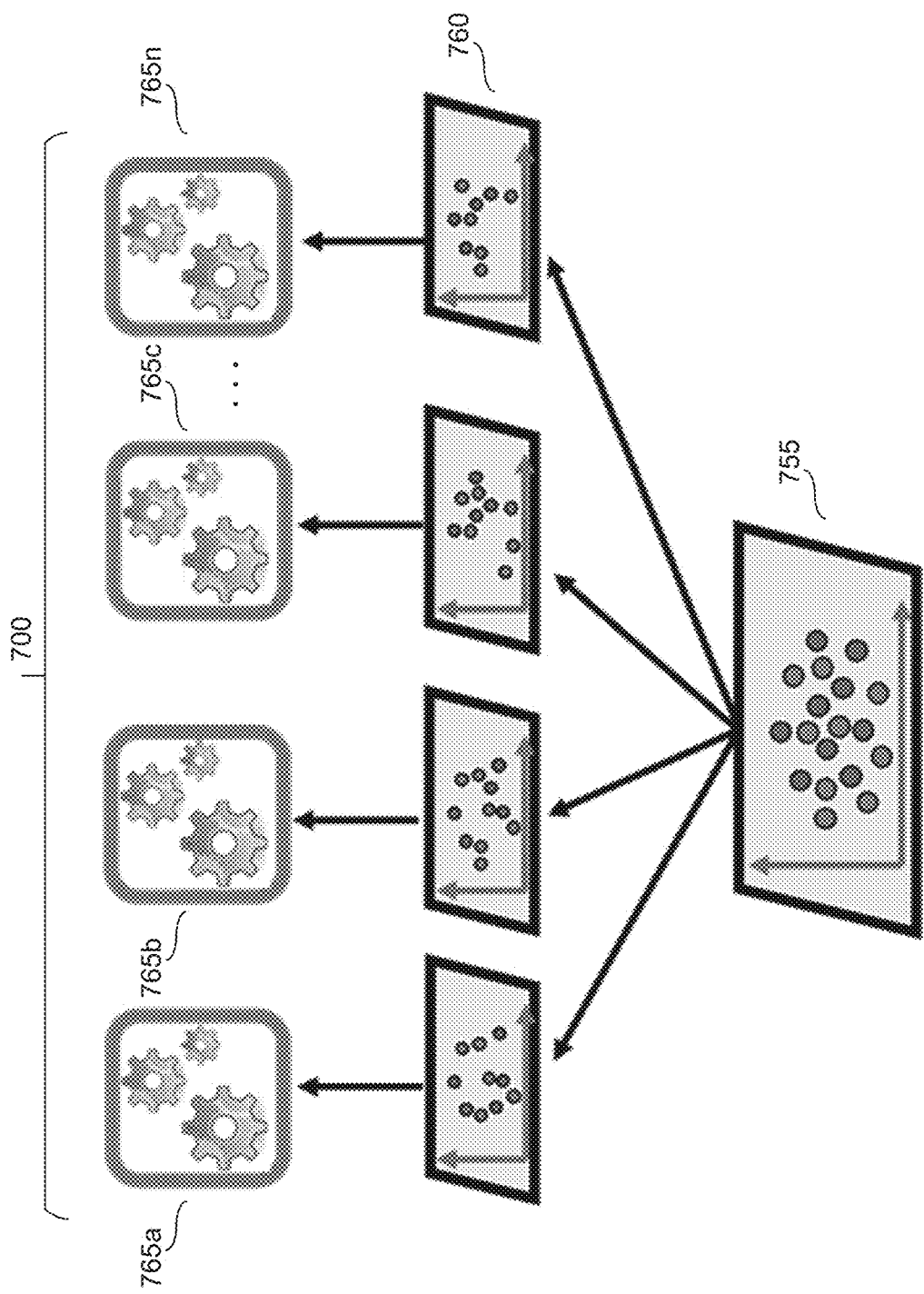

FIGS. 7A and 7B illustrates aspects of example implementations of LoS/NLoS classification using a random forest classifier model according to various embodiments of this disclosure. For convenience of cross-reference, items common to both FIGS. 7A and 7B are numbered similarly.

As determining whether a point in a coverage area of a base station may be considered a classification problem, random forest classifiers, which are well suited to both regression and classification problems and which work well with categorical (i.e., whether a UE has connectivity to Wi-Fi) as well as continuous, values (for example, values of RSRP) can, if provided with sufficient training data, be a highly effective tool for performing LoS/NLoS classification.

Referring to the non-limiting example of FIG. 7A, according to some embodiments, a random forest classifier 700 implemented at a core network, server, eNB or other computing platform receives measurement report data from one or more UEs in the coverage area of a base station. As shown in the illustrative example of FIG. 7A, the measurement report data comprises at least one measured value of a signal parameter 705 (for example, an RSRP value for a reference signal), as measured at the UE. According to certain embodiments, the signal parameter is an operating parameter common to multiple generations of wireless user equipment, thereby broadening the set of devices which can provide data to train random forest classifier 700, and devices which can provide data to obtain LoS/NLoS classifications from random forest classifier 700, once trained.

As shown in the illustrative example of FIG. 7A, in addition to a measured value of a signal parameter 705, the measurement data also comprises, at a minimum at least one value of a second parameter 710 expressing the location of the UE performing the measurements provided in the measurement report relative to the base station. In the illustrative example of FIG. 7A, second parameter 710 comprises a value of a three-dimensional distance (for example, a three-dimensional distance as calculated according to Equation (1) herein) of the base station to the measuring UE.

Depending on embodiments, random forest classifier 700 can also be provided with further features, including features from data provided in measurement reports, as well as base station-specific data. As shown in the explanatory example of FIG. 7A, random forest classifier 700 is, in addition to values of signal parameter 705 and second parameter 710, also provided with values of additional measurement report data fields 715a-715c, expressing the relative distance between the UE and base station along the x, y, and z-axes. In some embodiments, the further features may be base-station specific features, such as the height of the base station, or values of operating parameters of the station, such as electronic tilt or mechanical tilt values.

As shown in the explanatory example of FIG. 7A, similar to MLP 600 in FIG. 6, random forest classifier 700 passes the measurement report data for a given location and outputs a determination 720 of whether the values of the input set match what random forest classifier 700 has been trained to recognize as an LoS point or an NLoS point. In some embodiments, the output may be a binary vector (for example, where an output of $$\begin{bmatrix} 1 \\ 0 \end{bmatrix}$$

vector may correspond to a LoS point and an output of $$\begin{bmatrix} 0 \\ 1 \end{bmatrix}$$

vector may correspond to an NLoS point). In some embodiments the output may be a vector indicating the relative percentage of decision trees of random forest classifier 700 supporting a particular classification.

FIG. 7B illustrates aspects of training random forest classifier 700. In contrast to MLP 600 in FIG. 6, random forest classifier 700 operates based on a consensus of multiple models (referred to as decision trees), each of which considers a subset of the features within the input data.

According to certain embodiments, the features of the input set (for example, values of RSRP, 3-D distance, relative distance (x-axis), relative distance (y-axis), and relative distance (z-axis)) are algorithmically split using a bagging algorithm, which defines a set of T decision trees and introduces extra randomness when growing the trees. Thus, instead of searching for the very best feature for splitting a tree-node, random forest classifier 700 is built by initially randomly selecting a subset of features (for example, RSRP and relative distance (z-axis)) within the input data and then selecting the best features among the subsets of features through training.

According to some embodiments, training random forest classifier 700 comprises, for each of the decision trees generated using the bagging algorithm, a sub-sample training data from the full training set is used as training data for the decision tree. As shown in the illustrative example of FIG. 7B, $F=\{RSRP_u, d_u\, r_x^u, r_y^u, r_z^u | u \in \mathcal{U}\}$ denotes the set of measurement reports 755 from all reporting users, and $RSRP_u, d_u\, r_x^u, r_y^u, r_z^u$ are as described with reference to FIG. 7A. In this example, F provides a full training set for training random forest classifier 700.

In this example, T denotes a number of decision trees used in random forest classifier 700. For i-th decision tree, only a subset $F^{(i)}=\{RSRP_u, d_u\, r_x^u, r_y^u, r_z^u | u \in \mathcal{U}^{(i)}\}$ (760) may be used to train the decision tree, where $\mathcal{U}^{(i)}$ denotes the subset of full training set, i.e., $\mathcal{U}^{(i)} \in \mathcal{U}; \forall\ i=1, \ldots, T$.

Once trained, random forest classifier 700 comprises a set of individual models 765a-765n (i.e., 1-nth decision trees), each of which are fed a unique set of input features and output a classification of whether a particular location is LoS or NLoS. The output of random forest classifier is based on an aggregate of the outputs of each of the constituent decision trees. For example, where a majority of the constituent decision trees of random forest classifier 700 determine that a point is LoS, random forest classifier may output a binary vector categorizing the location as LoS.

While certain embodiments according to this disclosure have been described with reference to embodiments in which a classification of a point associated with measurement report data is obtained using machine learning techniques (for example, neural networks or random forest classifiers), embodiments according to this disclosure are not so limited. In some embodiments, statistical techniques, such as linear regression, may be used to develop a classifier for determining whether a location is LoS/NLoS based on measurement report data.

Figure 8:
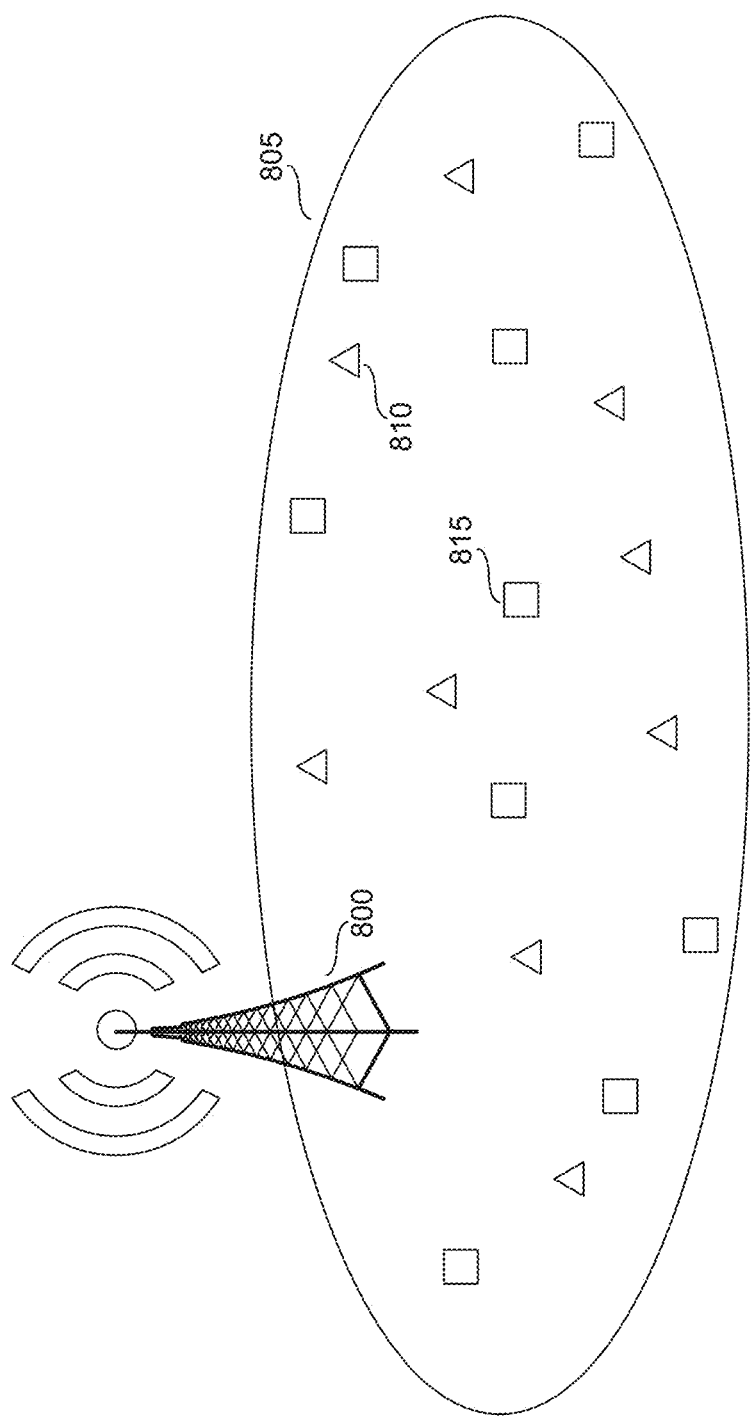
FIG. 8 illustrates aspects of an example of tuning a transmission parameter of a base station according to various embodiments of this disclosure.

FIG. 8 illustrates aspects of an example of tuning a transmission parameter of a base station according to various embodiments of this disclosure.

Referring to the explanatory example of FIG. 8, a base station 800 comprises an antenna set and one or more radio remote heads (RRH), which operate to transmit radio signals over a coverage area 805 comprising a geographic region wherein the value of at least one signal reception metric (for example, whether the strength of signals from the base station compared to those of a neighbor base station exceeds a handover threshold) satisfies one or more predefined criteria. The size and shape of coverage area 805 may depend on a number of parameters, including, without limitation, the transmission power of base station 800, the height of base station 800 relative to the ground, electrical tilt values (which can the angular value change the direction in which maximum gain of the antenna is produced), and mechanical tilt values (which can vary the extent to which coverage area 805 has sidelobes).

In certain embodiments, some of the parameters defining the shape and size of coverage area 805 cannot readily be tuned, such as the transmission power of the base station (which may be limited by regulations, such as rules set by the Federal Communications Commission), or the height of the antenna above the ground (which is set by the height of the tower to which it is attached). Thus, in some cases, the size and shape of coverage area is adjusted through one or more other transmission parameters, such as electronic or mechanical tilt. To tune the size and shape of coverage area 805, a network operator collects signal measurement reports from user equipment at locations in or around the current coverage area. As shown in FIG. 9, coverage area 805 includes points (for example, LoS point 810) which are LoS relative to base station, and represented in the figure by triangles, and points (for example, NLoS point 815), which are NLoS, and which are represented in the figure by squares. For the purposes of, for example, adjusting transmission parameters of base station 800 to tune the size and shape, UE data taken from locations where the strength and quality of the signal received is primarily dependent on the extent to which the base station is configured to focus its transmission on the location are more analytically relevant than locations where the measured strength and quality of a signal is primarily dependent on factors unrelated to the configuration of base station 800. For example, NLoS point 815 may be an indoor location that is otherwise well served by base station 800, but the signal quality at NLoS point 815 may be significantly diminished by absorption of radio waves by the adjacent walls and ceiling. Accordingly, systems and methods for LoS/NLoS classification according to certain embodiments of this disclosure provide the technical benefit of filtering measurement data to help ensure that transmission parameters of base station 800 are tuned based on actionable data. Additionally, certain embodiments according to this disclosure provide the additional technical benefit of providing network operators with a mechanism for obtaining up-to-date information regarding the LoS/NLoS locations within an area. Historically, network operators have relied on historically collected LoS/NLoS data to identify analytically preferable locations (i.e., LoS locations) relative to a base station. Such historical data presents at least two problems which can degrade their effectiveness as a tool for adjusting transmission parameters of a base station. First, historical data may be mis-entered (i.e., "fat fingered" by an operator entering data). Second, intervening events (for example, natural disasters changing local topographies, or new construction) may render historical data inaccurate. Certain embodiments as disclosed and claimed by the present application provide a mechanism for ongoing collection and updating of data classifying locations as LoS/NLoS from widely available operating data used by mobile devices.

FIG. 9 illustrates operations of an example method 900 for performing LoS/NLoS classification according to various embodiments of this disclosure. The operations described with reference to FIG. 9 may be performed at any suitably configured computing platform (for example, server 400 in FIG. 4) which is communicatively connected to a base station, that is in turn connected via wireless signals defining a coverage area of the base station to one or more user equipment.

Referring to the non-limiting example of FIG. 9, at operation 905, the network entity or other suitably configured computing platform collects, from at least one UE (for example, UE 105a in FIG. 1) within a service area of the base station, measurement report data (for example, data containing input features 610a-610n in FIG. 6, or data containing values of signal parameter 705 and second parameter 710 in FIG. 7). According to some embodiments, as part of operation 905, upon receiving the measurement report data, the network entity or other computing platform may pre-process the data, such as by filtering out report data which does not satisfy recency criteria, or which contains indicators (for example, values of a flag indicating Wi-Fi connectivity) strongly correlated with the measurement location being NLoS.

According to various embodiments, at operation 910, the network entity trains an LoS/NLoS classification model based on the measurement report data obtained at operation 905. In some embodiments, the LoS/NLoS classification model (for example, MLP 600 in FIG. 6, or random forest classifier in FIG. 7A) is trained using supervised learning techniques (i.e., against a data set with ground truth values for whether given locations are line of sight or non-line-of-sight). In various embodiments, the LoS/NLoS classification model is trained using unsupervised learning techniques (i.e., without testing against ground truth data), or semi-supervised learning techniques.

Referring to the explanatory example of FIG. 9, at operation 915, the network entity obtains, via a network interface, backhaul link, or other means of connection to the base station, a new measurement report from a UE operating a first location within the coverage area of the base station. According to certain embodiments, the new measurement report contains, at a minimum, a value of a signal parameter measured by the UE, and a value of a location parameter associated with the first location. In some embodiments, the signal parameter may be one or more of an RSRP value an RSRQ value of the base station.

According to various embodiments, at operation 920, the network entity passes the data of the new measurement report to the trained LoS/NLoS model to obtain a classification (for example, categorization 605 in FIG. 6, or determination 720 in FIG. 7A) of the first location as LoS/NLoS.

None of the description in this application should be read as implying that any particular element, step, or function is an essential element that must be included in the claim scope. Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for performing line-of-sight (LoS)/non-line-of-sight (NLoS) filtering, comprising:
   collecting, by a base station, from at least one user equipment (UE) operating within a coverage area of the base station, a plurality of measurement reports from the at least one UE, wherein each measurement report of the plurality of measurement reports comprises a measured value of a signal parameter and location information of the at least one UE;
   selecting, by the base station, a random forest LoS/NLOS classification model from among multiple LoS/NLOS classification models based on a topography of the coverage area of the base station;
   training, by the base station, the selected random forest LoS/NLOS classification model on the plurality of measurement reports by generating multiple decision trees based on randomly selected subsets of a set of input parameters and polling across the decision trees to identify predictive features, wherein the randomly selected subsets of input parameters correspond to parameters contained in the measurement reports;
   obtaining, by the base station, a new measurement report from a UE operating at a first location within the coverage area of the base station; and
   passing, by the base station, the new measurement report from the UE to the trained random forest LoS/NLOS classification model to obtain a LoS/NLOS classification of the first location of the UE.

2. The method of claim 1, further comprising:
   collecting, from the at least one UE operating within the coverage area of the base station, a second plurality of measurement reports from the at least one UE, wherein measurement reports of the second plurality of measurement reports comprise measurements taken at LoS locations and NLOS locations within the coverage area of the base station;
   passing the second plurality of measurement reports to the trained random forest LoS/NLOS classification model to identify measurement reports from LoS locations within the coverage area of the base station; and
   tuning a transmission parameter of the base station based on the identified measurement reports from LoS locations within the coverage area of the base station.

3. The method of claim 2, wherein the transmission parameter of the base station comprises at least one of an antenna height, an antenna pattern, an antenna azimuth angle, a mechanical tilt ("M-Tilt") angle or an electrical tilt ("E-Tilt") angle of the base station.

4. The method of claim 1, wherein the LoS/NLOS classification of the first location is at least one of a binary classification of the first location as LoS or NLOS, or a probabilistic representation of a relative likelihood of the first location being LoS or NLoS.

5. The method of claim 1, further comprising:
   transmitting, by the base station, to the at least one UE, a trigger message for collecting measurement report data and transmitting a measurement report to the base station; and
   transmitting by the base station, to the at least one UE, a reference signal for measurement by the at least one UE.

6. The method of claim 1, wherein the measured value of the signal parameter comprises at least one of a value of a reference signal received power (RSRP) from the base station, a value of an RSRP from a neighbor base station, or a reference signal received quality (RSRQ) from the base station.

7. A base station comprising:
   a processor;
   a network interface; and
   a memory containing instructions, which when executed by the processor, cause the base station to:
   collect, via the network interface, a plurality of measurement reports from at least one UE operating within a coverage area of the base station, wherein each measurement report of the plurality of measurement reports comprises a measured value of a signal parameter and location information of the at least one UE,
   select a random forest LoS/NLOS classification model from among multiple LoS/NLOS classification models based on a topography of the coverage area of the base station,
   train the selected random forest LoS/NLoS classification model on the plurality of measurement reports by generating multiple decision trees based on randomly selected subsets of a set of input parameters and polling across the decision trees to identify predictive features, wherein the randomly selected subsets of input parameters correspond to parameters contained in the measurement reports,
   obtain, via the network interface, a new measurement report from a UE operating at a first location within the coverage area of the base station, and
   pass the new measurement report from the UE to the trained random forest LoS/NLOS classification model to obtain a LoS/NLOS classification of the first location of the UE.

8. The base station of claim 7, wherein the memory contains instructions, which when executed by the processor, cause the base station to:
   collect, via the network interface, from the at least one UE operating within the coverage area of the base station, a second plurality of measurement reports from the at least one UE, wherein measurement reports of the second plurality of measurement reports comprise measurements taken at LoS locations and NLOS locations within the coverage area of the base station,
   pass the second plurality of measurement reports to the trained random forest LoS/NLOS classification model to identify measurement reports from LoS locations within the coverage area of the base station, and tune a transmission parameter of the base station based on the identified measurement reports from LoS locations within the coverage area of the base station.

9. The base station of claim 8, wherein the transmission parameter of the base station comprises at least one of an antenna height, an antenna pattern, an antenna azimuth angle, a mechanical tilt ("M-Tilt") angle or an electrical tilt ("E-Tilt") angle of the base station.

10. The base station of claim 7, wherein the LoS/NLOS classification of the first location is at least one of a binary classification of the first location as LoS or NLoS, or a probabilistic representation of a relative likelihood of the first location being LoS or NLoS.

11. The base station of claim 7, wherein the memory further contains instructions, which when executed by the processor, cause the base station to:

control the base station to transmit to the at least one UE, a trigger message for collecting measurement report data and transmitting a measurement report to the base station, and control the base station to transmit to the at least one UE, a reference signal for measurement by the at least one UE.

12. The base station of claim 7, wherein the measured value of the signal parameter comprises at least one of a value of a reference signal received power (RSRP) from the base station, a value of an RSRP from a neighbor base station, or a reference signal received quality (RSRQ) from the base station.

13. A non-transitory computer readable medium containing instructions that when executed cause at least one processor of a base station to:

collect a plurality of measurement reports from at least one UE operating within a coverage area of the base station, wherein each measurement report of the plurality of measurement reports comprises a measured value of a signal parameter and location information of the at least one UE;

select a random forest LoS/NLOS classification model from among multiple LoS/NLOS classification models based on a topography of the coverage area of the base station;

train the selected random forest LoS/NLOS classification model on the plurality of measurement reports by generating multiple decision trees based on randomly selected subsets of a set of input parameters and polling across the decision trees to identify predictive features, wherein the randomly selected subsets of input parameters correspond to parameters contained in the measurement reports;

obtain a new measurement report from a UE operating at a first location within the coverage area of the base station; and pass the new measurement report from the UE to the trained random forest LoS/NLoS classification model to obtain a LoS/NLOS classification of the first location of the UE.

14. The non-transitory computer readable medium of claim 13, further containing instructions that when executed cause the at least one processor to:

collect, from the at least one UE operating within the coverage area of the base station, a second plurality of measurement reports from the at least one UE, wherein measurement reports of the second plurality of measurement reports comprise measurements taken at LoS locations and NLOS locations within the coverage area of the base station;

pass the second plurality of measurement reports to the trained random forest LoS/NLOS classification model to identify measurement reports from LoS locations within the coverage area of the base station; and tune a transmission parameter of the base station based on the identified measurement reports from LoS locations within the coverage area of the base station.

15. The non-transitory computer readable medium of claim 14, wherein the transmission parameter of the base station comprises at least one of an antenna height, an antenna pattern, an antenna azimuth angle, a mechanical tilt ("M-Tilt") angle or an electrical tilt ("E-Tilt") angle of the base station.

16. The non-transitory computer readable medium of claim 13, wherein the LoS/NLOS classification of the first location is at least one of a binary classification of the first location as LoS or NLOS, or a probabilistic representation of a relative likelihood of the first location being LoS or NLoS.

17. The non-transitory computer readable medium of claim 13, further containing instructions that when executed cause the at least one processor to:

control the base station to transmit to the at least one UE, a trigger message for collecting measurement report data and transmitting a measurement report to the base station; and control the base station to transmit to the at least one UE, a reference signal for measurement by the at least one UE.

18. The non-transitory computer readable medium of claim 13, wherein the measured value of the signal parameter comprises at least one of a value of a reference signal received power (RSRP) from the base station, a value of an RSRP from a neighbor base station, or a reference signal received quality (RSRQ) from the base station.

* * * * *